United States Patent [19]
Emblem et al.

[11] 3,979,215
[45] Sept. 7, 1976

[54] REFRACTORY ARTICLES AND METHODS OF PRODUCING SAME

[75] Inventors: Harold Garton Emblem, Grappenhall, near Warrington; Leslie Edward Shiel, Newcastle-upon-Tyne, both of England

[73] Assignee: Zirconal Processes Limited, Bromley, England

[22] Filed: July 1, 1974

[21] Appl. No.: 484,399

Related U.S. Application Data

[62] Division of Ser. No. 256,728, May 25, 1972, abandoned.

[52] U.S. Cl. .................................... 106/55; 106/69

[51] Int. Cl.² ........................................ C04B 35/14
[58] Field of Search .............. 106/65, 69, 38.35, 55

[56] References Cited
UNITED STATES PATENTS
3,399,067   8/1968   Scott.................................. 106/65

*Primary Examiner*—J. Poer
*Attorney, Agent, or Firm*—Christensen, O'Connor, Garrison & Havelka

[57] ABSTRACT

A gel is prepared through the intermediary of an acid hydrolysate. The hydrolysate is produced by the hydrolysis of an organic silicate with the metal salt whose oxide it is desired to gell.

21 Claims, No Drawings

REFRACTORY ARTICLES AND METHODS OF PRODUCING SAME

This is a division of application Ser. No. 256,728, filed May 25, 1972 now abandoned.

The present invention relates to the preparation of gels from silica and at least one oxide selected from the alkaline earth metals (including magnesium), zinc, aluminium, zirconium and chromium.

According to the present invention, there is provided a method of preparing a gel from silica and at least one oxide selected from the alkaline earth metals, zinc, aluminium, zirconium and chromium, which method comprises preparing an acid hydrolysate by hydrolysis of an organic silicate with an acidic aqueous solution of a salt of the metal or metals whose oxide is desired in the gel, and subsequently causing the hydrolysate to gel. The present invention also provides a method of preparing an acid hydrolysate by hydrolysis of an organic silicate with an acidic aqueous solution of at least one metal selected from the soluble salts of alkaline earth metals, zinc, aluminium, zirconium and chromium.

The term "alkaline earth metals" as used in this specification includes magnesium and the preferred alkaline earth metals for use in the present invention are calcium and magnesium.

Suitable organic silicates for use in the present invention are the $C_1 - C_6$ alkyl orthosilicates, polysilicates and mixtures thereof. One preferred silicate is commercially available ethyl silicate which is a mixture of ethyl orthosilicate and ethyl polysilicate having a silica content of 40% w/w.

The soluble metal salts preferably are the metal chlorides but other salts soluble in the selected aqueous solvent for the hydrolysis may be employed. Fluorides are not, in general, suitable due to the possibility of $S_iF_4$ forming during firing of a refractory article including the gel. The aqueous solvent preferably is a mixture of water and a miscible monohydric alcohol, e.g.: ethyl alcohol, but any of the aqueous solvents conventionally employed in the hydrolysis of organic silicates can be used provided that insoluble metal salts are not formed thereby precipitating metal values from the hydrolysis medium. In particular, it may be necessary to use a dilute aqueous solution of a strong acid e.g.: hydrochloric acid, which is non-oxidizing under the hydrolysis conditions instead of water in the solvent in order to provide the degree of acidity required for the hydrolysis reaction to proceed efficiently. It will be appreciated that it is well within the ability of any man skilled in the art to determine optimum hydrolysis conditions by simple experimentation.

Taking ethyl silicate (silica content about 40% w/w) it has been found that the hydrolysis will proceed efficiently if the appropriate metal chloride is dissolved in water or in dilute hydrochloric acid solution (dependent upon the acidity of the aqueous salt solution) and a quantity of ethyl alcohol then added, followed by an ethyl silicate containing 40% w/w silica. The reaction mixture is then allowed to stand without heating to yield a gellable acid hydrolysate.

The acid hydrolysate of this invention may be gelled by the action of an alkaline medium, e.g.: aqueous ammonia or an aqueous suspension of an alkaline earth metal oxide. Standard techniques for the gellation of acid hydrolysates of organic silicates may be employed subject to the necessity of carefully controlling the gellation conditions to ensure that synchronous gellation of each component of the acid hydrolysate occurs resulting in a strong coherent gel. The preferred alkaline systems are aqueous ammonia, an aqueous solution of ammonia and ammonium acetate and an aqueous dispersion of magnesia prepared as described in the Complete Specification of our co-pending United Kingdom Patent Application No. 52693/70 (now U.S. Pat. No. 1,356,247). If the gellation of each component does not synchronise, precipitation or flocculation of part or all of each component results and the strong coherent gel is not obtained. The precise gellation conditions to be used will depend inter alia on the components of the acid hydrolysate and the alkaline medium but easily can be determined by trial-and-error.

The gel obtained by the method of the invention may be a silica-metal oxide co-gel or a metal silicate gel. The nature of the gel will depend on the metal, also on the metal/silicon ratio.

The gels of the present invention are particularly suitable for the binding of refractory aggregates, either in the production of shaped refractory articles or in the preparation of moulds for casting metals. Examples of suitable refractories are aluminium oxide, aluminium silicate; an aluminosilicate, a mixture of aluminium oxide and aluminum silicate or an aluminosilicate, magnesium oxide, magnesium silicate, a mixture of magnesium oxide and magnesium silicate, zirconium oxide, a mixture of zirconium oxide and zircon, crystalline silicon oxide, silicon carbide and spinel. Gels formed from silica and magnesia are particularly suitable for binding magnesite or chrome magnesite refractories. Some of the gels of the present invention are useful as catalysts, particularly the gels formed from alumina & silica. The gels of the present invention, moreover particularly gels formed from silica and zinc oxide, can be used as paint pigment binders.

The invention is illustrated by the following examples in which the preferred ethyl silicate is used as the organic silicate:

EXAMPLE I

Gel formed from silica and magnesia 10g of anhydrous magnesium chloride were dissolved in 40 ml of N hydrochloric acid and 200 ml of ethyl alcohol 64 O.P. were added to the salt solution thus formed. 160 ml of ethyl silicate were then added to the aqueous-alcohol mixture. After ten minutes an acid hydrolysate was obtained. This hydrolysate set to a firm coherent gel when treated with an accelerator comprising aqueous ammonia prepared by diluting to 60 ml, 23 ml of a reference ammonia solution. The reference ammonia solution was obtained by the dilution of 50 ml of 0.88SG aqueous ammonia to 250 ml.

7 lbs of suitably graded sillimanite were added to a mixture of an acid hydrolysate, prepared as above and aqueous ammonia (diluted reference solution referred to above) to give a slurry. The slurry was poured into a mould then allowed to set to form a "green" shaped article. When the slurry had set, the shaped article was removed from the mould, air-dried and then fired in known manner to obtain a shaped refractory article.

Similar results are obtained if the solution contains 50 or 75 g $M_g Cl_2$ per 100 ml of acid. Increasing the proportion of $M_g Cl_2$ increases the "green strength" of the refractory object. Solutions containing 75 g $M_g Cl_2$ per 100 ml of acid are difficult to prepare because of the large amount of $M_nCl_2$. 50 g $M_nCl_2$ per 100 ml of acid is the preferred amount. Preparation of the solution is easy, also both "green" and fired strengths of refractory objects are good. For this solution the preferred accelerator is made up as follows: 50 ml of aqueous ammonia solution, sp. gr. 0.88 are diluted to 500 ml with deionised water. To 50 ml of this dilute ammonia solution is added 50 ml of deionised water containing 3.0 grams of ammonium acetate in solution.

EXAMPLE II

Gel formed from silica and alumina

A hydrolysate was prepared by dissolving 5.0 g anhydrous aluminium chloride (or 9.0 g aluminium chloride hexahydrate) in 20 ml deionised (or distilled) water, adding 110 ml ethyl alcohol 64 O.P to the dissolved salt and then adding 80 ml ethylsilicate (40% $SiO_2$) to the aqueous — alcohol mixture. Considerable heat was developed during the hydrolysis reaction obtained and the hydrolysate was cooled to ambient temperature. The pH of the hydrolysate was adjusted to about pH 2 by the addition of 3.0 g of lightly calcined magnesium oxide.

Gellation of the hydrolysate thus obtained was brought about by the addition of magnesium oxide. The gel time was dependent not only upon the amount of magnesium oxide which was added, but also upon the conditions under which the magnesium oxide was added.

A magnesium oxide dispersion was prepared by dispersing 10.0 g lightly calcined magnesia in a mixture of 50 ml glycerol and 50 ml deionised water and then warming the mixture to stabilize the dispersion. A study of the effect of this stabilised magnesia on gellation characteristics was carried out by adding various amounts of gellation agent to the acid hydrolysate obtained as above.

The results obtained were as follows:
1. Alkaline medium: 7.5 ml magnesia dispersion plus 25 ml deionised water; gel time: 14 minutes.
2. Alkaline medium: 10 ml magnesia dispersion plus 20 ml deionised water; gel time: 10 minutes, 15 seconds giving an adhesive gel setting ultimately to a very hard mass.
3. Alkaline medium: 15 ml magnesia dispersion plus 15 ml deionised water; gel time: 9 minutes, 15 seconds giving an adhesive gel setting ultimately to a very hard mass.
4. Alkaline medium: 20 ml magnesia dispersion plus 10 ml deionised water; gel time: 9 minutes 20 seconds.
5. Alkaline medium: 25 ml magnesia dispersion plus 5 ml deionised water; gel time: 6 minutes.
6. Alkaline medium: 30 ml magnesia dispersion gel time: 6 minutes 15 seconds.

A study of the effect of the glycerol content of the dispersing agent was made by keeping the solids content of the suspension constant and varying the glycerol content of the suspending medium. A fixed volume of the acid hydrolysate was used.

10 g of lightly calcined magnesia was suspended in 50 ml of suspending medium (a water/glycerol mixture) and 30 ml of the suspension was used in each test. The results obtained were as follows:

a. No glycerol in suspending medium; gel time: 6 minutes; adhesive gel initially formed developing considerable strength after gellation.

b. 25% v/v glycerol in suspending medium; gel time: 3¾ minutes; developing strength on standing. Very useful as a binder for refractory materials.

c. 50% v/v glycerol in suspending medium; gel time: 6¼ minutes; developing strength on standing giving a very hard gel.

d. No water in suspending medium; gel time: 13½ minutes.

EXAMPLE III

Gel formed from silica and zirconia

To 20 ml of a zirconium oxychloride solution (20%) were added 110 mls of ethyl alcohol 64 O.P. and 80 mls of ethylsilicate (40% $SiO_2$). Considerable heat was developed during hydrolysis to yield a hydrolysate gelling on standing at ambient temperature for 18 hours to give a gel.

EXAMPLE IV

Gel formed from silicia and calcium oxide

A hydrolysate was prepared by dissolving 10.0 gr. of hydrated calcium chloride ($CaCl_2 \cdot 6H_2O$) in 20 ml of N/1 hydrochloric acid solution, adding 110 ml of ethyl alcohol (64 O.P.) and 80 ml of ethyl silicate (40% $SiO_2$). Considerable heat was developed during the hydrolysis reaction obtained, a temperature rise of 15°C. being recorded. The hydrolysate was allowed to cool to ambient temperature in the course of 2 hours.

The gellation accelerator for this solution was prepared by diluting 50 ml of aqueous ammonia solution, sp. gr. 0.88 to 500 ml with deionised water. 30 ml of this dilute ammonia solution was added to 70 ml of deionised water containing 2.0 grams of ammonium acetate, to give the gellation accelerator.

50 ml of the hydrolysate and 15 ml of the accelerator solution gave a gel in 75 seconds. A good adhesive gel, very firm when set, was obtained.

EXAMPLE V

Gel formed from silica and calcium oxide 1.0 ml of concentrated hydrochloric acid solution (sp.gr. 1.18) was added to 19.0 g of hydrated calcium chloride ($CaCl_2 \cdot 6H_2O$). This was warmed gently, a solution being obtained at 35°C. (Crystals were deposited on cooling). To the solution at 35°C was added 60 ml of ethyl alcohol (64 O.P. I.M.S.) and 40 ml of ethyl silicate (40% $SiO_2$ content). The mixture was warmed at 60°C until it became homogeneous. This required about ten minutes. A clear hydrolysate was obtained on cooling to ambient temperature.

A gellation accelerator was prepared by diluting 50 ml of aqueous ammonia solution, sp. gr. 0.88, to 500 ml with deionised water and adding to 50 ml of this dilute ammonia solution 50 ml of deionised water containing 3.0 grams of ammonium acetate in solution. When 5.0 ml of the gellation accelerator was added to 25 ml of the hydrolysate, gellation occurred in about 30 seconds, to give a good, strong and adhesive gel, suitable for use as a binder of a refractory aggregate comprising a mixture of zircon and zirconia.

EXAMPLE VI

Gel formed from silica and chromic oxide

To 26.0 g of hydrated chromic chloride crystals ($CrCl_3 \cdot 6H_2O$) was added 8.0 ml deionised water and 2.0 ml concentrated hydrochloric acid solution (sp. gr.

1.18). This did not dissolve all the chromium salt. However, the addition of 110 ml ethyl alcohol (64 O.P. I.M.S.) dissolved all the chromium salt. 80 ml of ethyl silicate (40% $SiO_2$) was now added. The mixture was stirred, during stirring there was a temperature rise of 19°C, stirring being continued until the mixture cooled to ambient temperature (this took about 30 minutes). The mixture was allowed to stand at ambient temperature for 1 hour before being used to bind a powdered alumina. The gellation characteristics of the hydrolysate were as follows:

a. To 50 ml of hydrolysate added a solution of 6 g. ammonium acetate in 6 ml deionised water — gel time about 30 minutes.

b. To 50 ml of hydrolysate added a solution of 10 g. ammonium acetate in 5 ml deionised water — gel time about 2 minutes, giving a strong, adhesive gel.

c. The hydrolysate was still fluid 24 hours after preparation, but had set to a gel 48 hours after preparation. Three refractory pieces were prepared from a fine alumina mix, being a mixture of fused alumina — 30 + 80 mesh B.S. 410 sieve, 2 parts by weight, fused alumina — 200 mesh B.S. 410 sieve, 1 part by weight. 12 oz. of the alumina mix was used, with 40 ml of the hydrolysate, the gellation agent being a solution of 8.0 g ammonium acetate in 5.0 ml deionised water. This gave a working time of about 2 minutes. The pieces were fired to 1200°C for 3 hours, giving strong, green coloured pieces. One piece was fired to 1450°C for 6 hours under oxidising conditions. After this firing, the piece was a uniform pink colour and very strong.

EXAMPLE VII

Gel formed from silica and zinc oxide 31.5 g anhydrous zinc chloride was dissolved in 20 ml of N/1 hydrochloric acid solution. There was a small evolution of heat, the zinc chloride dissolving quite readily. 110 ml of ethyl alcohol (64 O.P. I.M.S.) was now added, followed by 80 ml of ethyl silicate ($SiO_2$ content 40% w/w). The mixture was at first turbid, becoming clear after stirring for about 45 minutes. There was a temperature rise of about 20°C. The hydrolysate was allowed to cool to ambient temperature, then left for about 5 hours at ambient temperature.

To 50 ml of the hydrolysate added a solution of 10.0 g ammonium acetate in 10 ml deionised water— gel time 6 minutes, no precipitation of zinc compounds, a rubber-like clear gel, slow in gaining strength.

EXAMPLE VIII

Gel formed from silica and magnesia

To 10 ml deionised water, 0.6 ml of concentrated hydrochloric acid solution was added, then 5.0 g anhydrous magnesium chloride was dissolved in this mixture. 84 ml of ethyl alcohol (64 O.P. I.M.S.) was added, followed by 160 ml of ethyl silicate ($SiO_2$ content 40% w/w). The mixture was not clear at first, but clarified on warming to 60°C in the course of 30 minutes. It was now allowed to cool to ambient temperature and aged for 24 hours before the gellation characteristics were determined.

a. To 50 ml of the hydrolysate added a solution of 1 g ammonium acetate dissolved in 5 ml deionised water — gel time 17 minutes. The gel was slow in gaining strength, but there was no precipitation of magnesium salts.

b. To 50 ml of the hydrolysate added a solution of 3 g ammonium acetate dissolved in 5 ml deionized water. The gel time was 7 minutes, with precipitation of magnesium salts.

c. Refractory pieces were prepared from a fine sillimanite mix. 9 oz. of the sillimanite mix were used with 45 ml of the hydrolysate to which was added a solution of 1 g ammonium acetate in 4 ml deionised water. A good refractory body was obtained on firing at 1200°C for 3 hours.

EXAMPLE IX

Gel formed from silica and magnesia derived from hydrated magnesium acetate $(CH_3 COO)_2 Mg\ 4H_2O$

| Ingredients: | |
|---|---|
| Hydrated magnesium acetate | 10 g. |
| Concentrated hydrochloric acid solution (sp. gr. 1.18) | 10 ml. |
| Deionised water | 7 ml. |
| Ethyl alcohol (64 O.P. I.M.S.) | 110 ml. |
| Ethyl silicate (40% $SiO_2$) | 80 ml. |

The hydrated magnesium acetate was dissolved in the water and concentrated hydrochloric acid, then the ethyl alcohol and ethyl silicate were added. This mixture cleared quite rapidly on stirring. There was a temperature rise of 20°C. The hydrolysate was allowed to cool to ambient temperature.

To 50 ml of the hydrolysate was added a solution of 8 g ammonium acetate in 5 ml deionised water. The gel time was 1 minute.

Small refractory pieces were made using a sillimanite-mullite mix. 9 oz. of this mix were used with 50 ml of the hydrolysate, the gelling agent being a solution of 8 g ammonium acetate in 5 ml deionised water. After firing for 3 hours at 1200°C good refractory bodies were obtained. The refractory mix used was

| Sillimanite - 30 + 80 | 1½ parts by weight. |
|---|---|
| Fused mullite - 200 | 1 part by weight. |

EXAMPLE X

Gel formed from silica and magnesia

A powdered refractory aggregate was prepared as follows. A mixture of zircon sand (all passing 60 mesh B.S. 410 sieve) — 7 parts by weight. Zircon flour (all passing 200 mesh B.S. 410 sieve) — 2 parts by weight. Stabilised zirconia flour (all passing 200 mesh B.S. 410 sieve) — 1 part by weight was prepared. To 100 parts by weight of the above mixture, 5 parts by weight of fused alumina (all passing 200 mesh B.S. 410 sieve) were added. Two parts by weight of the resulting zircon-zirconia-alumina mixture were added to one part by weight of "zircon grog" siz — 10 + 30 B.S. 410 sieve, to give the powdered refractory aggregate. The "zircon grog" was prepared by suitably grading crushed zircon bricks.

The powdered refractory aggregate was bonded with a hydrolysate prepared as in Example I but containing 50 g anhydrous $MgCl_2$ per 100 ml of N/1 hydrochloric acid solution. The gellation accelerator used was the preferred accelerator previously given. For one pound of the refractory aggregate, 42 ml of the hydrolysate were used, together with the accelerator solution in the proportion of 20 ml accelerator solution to 100 ml of hydrolysate. This gives a slurry having a working time of about 5 minutes. The air-drying and firing of refractory objects made in this way follows standard practice.

It will be noted that the hydrolysis conditions for the ethyl silicate, with the example of Example 8, are those set out in the Complete Specification of our co-pending United Kingdom Patent Application No. 52695/70 (now U.S. Pat. No. 1,356,249).

We claim:
1. A process for producing a shaped refractory article comprising:
   a. forming a gelable binding solution by hydrolyzing together under acidic conditions (1) an organic silicate and (2) a salt of a metal selected from the group consisting of calcium, magnesium, zinc, aluminum, zirconium and chromium, said hydrolyzing being carried out in an aqueous solvent for the silicate and the salt;
   b. mixing with the binding solution so formed a refractory powder and an alkaline gelation accelerator to form a slurry;
   c. forming a self-supporting body by molding the slurry into a desired shape and allowing the binding solution to gel; and
   d. firing the resulting body.
2. The process of claim 1 wherein the organic silicate is a $C_1$-$C_6$ alkyl orthosilicate, polysilicate or a mixture thereof.
3. The process of claim 1 wherein the metal salt is a chloride salt.
4. The process of claim 1 wherein the metal is calcium or magnesium.
5. The process of claim 1 wherein the salt is calcium chloride.
6. The process of claim 1 wherein the salt is magnesium chloride.
7. The process of claim 1 wherein the solvent comprises a water-miscible monohydric alcohol.
8. The process of claim 1 wherein the gelation accelerator comprises ammonia.
9. The process of claim 1 wherein the gelation accelerator is an aqueous solution of ammonia and ammonium acetate.
10. The process of claim 1 wherein the gelation accelerator comprises magnesium oxide.
11. The process of claim 1 wherein the organic silicate is ethyl silicate.
12. The process of claim 11 wherein the ethyl silicate is a mixture of ethyl orthosilicate and ethyl polysilicate having a silica content of about 40% by weight.
13. The process of claim 11 wherein the metal salt is a chloride salt.
14. The process of claim 11 wherein the salt is magnesium chloride.
15. The process of claim 11 wherein the solvent comprises a water-miscible monohydric alcohol.
16. The process of claim 11 wherein the gelation accelerator comprises ammonia.
17. The process of claim 11 wherein the gelation accelerator is an aqueous solution of ammonia and ammonium acetate.
18. The process of claim 11 wherein the gelation accelerator comprises magnesium oxide.
19. A refractory article produced by the process of claim 1.
20. A refractory article produced by the process of claim 4.
21. A refractory article produced by the process of claim 14.

* * * * *